(12) United States Patent
Siddhanthi et al.

(10) Patent No.: US 10,113,462 B2
(45) Date of Patent: Oct. 30, 2018

(54) ADVANCED EXHAUST AFTERTREATMENT SYSTEM ARCHITECTURE

(71) Applicant: Cummins Inc., Columbus, IN (US)

(72) Inventors: Rohan A. Siddhanthi, Columbus, IN (US); Bryon D. Staebler, Columbus, IN (US); Krishna Kamasamudram, Columbus, IN (US)

(73) Assignee: Cummins Inc., Columbus, IN (US)

( * ) Notice: Subject to any disclaimer, the term of this patent is extended or adjusted under 35 U.S.C. 154(b) by 127 days.

(21) Appl. No.: 15/136,427

(22) Filed: Apr. 22, 2016

(65) Prior Publication Data

US 2016/0312678 A1  Oct. 27, 2016

Related U.S. Application Data

(60) Provisional application No. 62/152,499, filed on Apr. 24, 2015.

(51) Int. Cl.
| | |
|---|---|
| *F01N 3/20* | (2006.01) |
| *B01D 53/94* | (2006.01) |
| *F01N 13/00* | (2010.01) |
| *F01N 3/021* | (2006.01) |

(52) U.S. Cl.
CPC ....... *F01N 3/2066* (2013.01); *B01D 53/9418* (2013.01); *B01D 53/9431* (2013.01); *F01N 3/021* (2013.01); *F01N 13/0093* (2014.06); *B01D 53/9477* (2013.01); *B01D 2251/2062* (2013.01); *B01D 2255/20723* (2013.01); *B01D 2255/20738* (2013.01); *B01D 2255/20761* (2013.01); *B01D 2255/50* (2013.01); *B01D 2255/904* (2013.01); *B01D 2255/911* (2013.01); *B01D 2257/404* (2013.01); *B01D 2258/012* (2013.01); *F01N 2240/40* (2013.01); *F01N 2510/063* (2013.01); *F01N 2610/02* (2013.01); *Y02C 20/10* (2013.01); *Y02T 10/24* (2013.01)

(58) Field of Classification Search
None
See application file for complete search history.

(56) References Cited

U.S. PATENT DOCUMENTS

| | | | |
|---|---|---|---|
| 7,264,785 B2 | 9/2007 | Blakeman et al. | |
| 7,984,609 B2 | 7/2011 | Doring et al. | |
| 8,105,560 B2 | 1/2012 | Phillips et al. | |
| 8,398,943 B2 | 3/2013 | Doring et al. | |
| 8,506,893 B2 | 8/2013 | Gandhi et al. | |
| 8,863,507 B2 | 10/2014 | Adelmann et al. | |
| 9,017,626 B2 * | 4/2015 | Tang | B01J 37/0036 423/213.2 |

(Continued)

FOREIGN PATENT DOCUMENTS

| | | |
|---|---|---|
| EP | 2 292 904 | 3/2011 |
| EP | 2 295 754 | 3/2011 |

*Primary Examiner* — Walter D. Griffin
*Assistant Examiner* — Jelitza M Perez
(74) *Attorney, Agent, or Firm* — Foley & Lardner LLP

(57) ABSTRACT

An exhaust aftertreatment system configured to reduce nitrous oxide ($N_2O$) formation includes a first selective catalytic reduction (SCR) catalyst. The first SCR catalyst is configured for low $N_2O$ formation and low ammonia ($NH_3$) storage capacity. A second SCR catalyst is positioned downstream of the first SCR catalyst. The second SCR catalyst is configured for high $NH_3$ storage capacity.

17 Claims, 5 Drawing Sheets

(56) References Cited

U.S. PATENT DOCUMENTS

| | | | |
|---|---|---|---|
| 9,468,915 B2* | 10/2016 | Vaarkamp | B01J 23/22 |
| 9,597,636 B2* | 3/2017 | Sonntag | B01J 35/0006 |
| 2009/0193794 A1* | 8/2009 | Robel | F02M 26/15 |
| | | | 60/295 |
| 2010/0319320 A1* | 12/2010 | Mital | F01N 3/035 |
| | | | 60/285 |
| 2014/0161679 A1 | 6/2014 | Chiffey et al. | |
| 2014/0271422 A1* | 9/2014 | Tang | B01J 23/22 |
| | | | 423/212 |
| 2016/0166990 A1* | 6/2016 | Phillips | F01N 3/2066 |
| | | | 423/239.1 |
| 2016/0230631 A1* | 8/2016 | Mital | F01N 3/2066 |
| 2016/0279571 A1* | 9/2016 | Tsuji | B01D 53/9418 |

* cited by examiner

ADVANCED EXHAUST AFTERTREATMENT SYSTEM ARCHITECTURE

CROSS-REFERENCE TO RELATED PATENT APPLICATIONS

This application claims the benefit of and priority to U.S. Provisional Patent Application No. 62/152,499, filed Apr. 24, 2015, the contents of which are incorporated herein by reference in its entirety.

TECHNICAL FIELD

The present disclosure relates generally to the field of internal combustion engine exhaust aftertreatment systems.

BACKGROUND

In general, regulated emissions for internal combustion (IC) engines include carbon monoxide (CO), hydrocarbons (HC), nitrogen oxides ($NO_x$), and particulates. However, such regulations have become more stringent over recent years. For example, the regulated emissions of $NO_x$ and particulates from diesel-powered IC engines are low enough that, in many cases, the emissions levels cannot be met with improved combustion technologies alone. To that end, exhaust aftertreatment systems are increasingly utilized to reduce the levels of harmful exhaust emissions present in exhaust gas.

Conventional exhaust gas aftertreatment systems include any of several different components to reduce the levels of harmful exhaust emissions present in exhaust gas. For example, certain exhaust aftertreatment systems for diesel-powered IC engines include various components, such as a diesel oxidation catalyst (DOC), a selective catalytic reduction (SCR) catalyst, a diesel particulate filter (DPF), an SCR on filter, and/or an ammonia slip catalyst (ASC) (also referred to as an ammonia oxidation catalyst (AMOX)). Each of the DOC, SCR catalyst, DPF, SCR on filter, and/or the ASC components are configured to perform a particular exhaust emissions treatment operation on the exhaust gas passing through or over the respective components.

SUMMARY

Various embodiments relate to exhaust aftertreatment systems. An example exhaust aftertreatment system includes a first SCR catalyst. The first SCR catalyst is configured for low nitrous oxide ($N_2O$) formation and low ammonia ($NH_3$) storage capacity. A second SCR catalyst is positioned downstream of the first SCR catalyst. The second SCR catalyst is configured for high $NH_3$ storage capacity.

Various other embodiments relate to systems including an exhaust aftertreatment system that is fluidly coupled to an exhaust manifold of an engine. The exhaust aftertreatment system includes a first SCR catalyst. The first SCR catalyst is configured for low $N_2O$ formation and low $NH_3$ storage capacity. A second SCR catalyst is positioned downstream of the first SCR catalyst. The second SCR catalyst is configured for high $NH_3$ storage capacity.

These and other features, together with the organization and manner of operation thereof, will become apparent from the following detailed description when taken in conjunction with the accompanying drawings, wherein like elements have like numerals throughout the several drawings described below.

Figure 1:
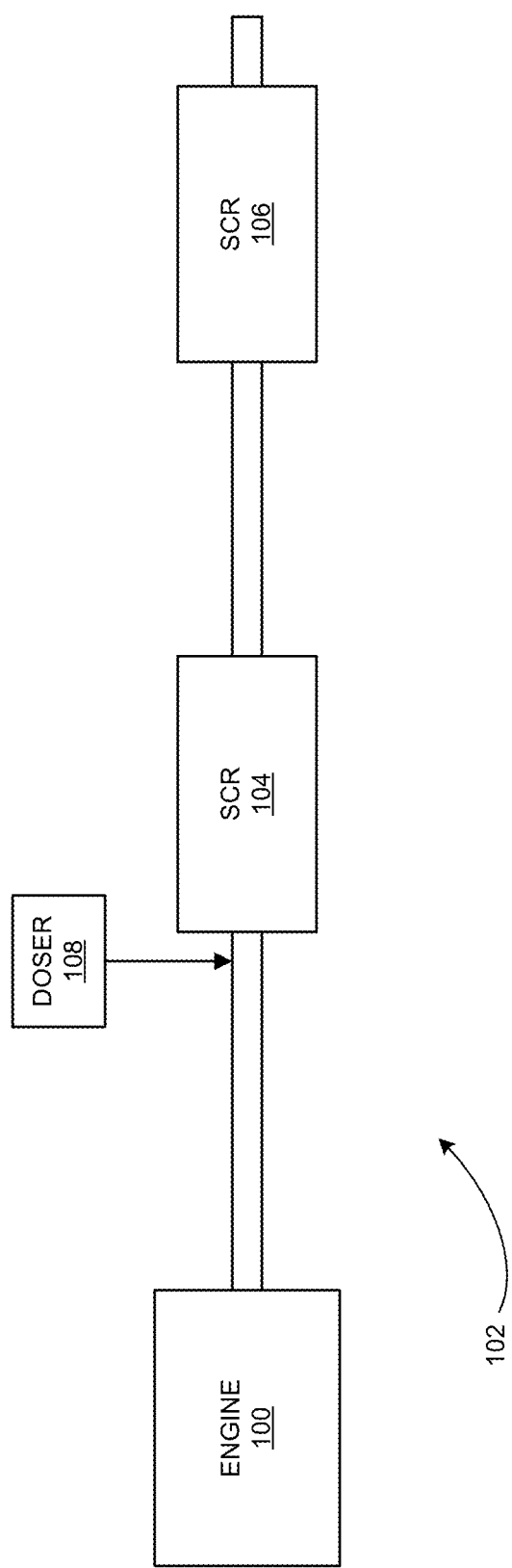
FIG. 1 is a block diagram illustrating an exhaust aftertreatment system, according to an embodiment.

DETAILED DESCRIPTION $N_2O$ may be formed from an undesired reaction between $NO_x$ and $NH_3$ over a catalytic device, such as an SCR catalyst. The present disclosure is directed to advanced exhaust aftertreatment system architectures configured to minimize $N_2O$ formation, while improving de-$NO_x$ performance. Based on empirical measurements and reaction engineering principles, it has been found that $NO_x$ and $NH_3$ concentration profiles in catalysts exponentially decline along the axial direction of the catalyst (e.g., along the exhaust gas flow direction) due to their consumption by SCR reactions. This also results in a decrease in $N_2O$ formation, which is a byproduct of the SCR reaction, along the axial length of the catalyst.

According to various embodiments, exhaust aftertreatment system architectures include a combination of SCR catalysts having different catalyst formulations. In an embodiment, part of an upstream SCR catalyst, where a majority of $NO_x$ conversion and $N_2O$ formation occurs, includes a catalyst material that is configured to produce less $N_2O$ compared to conventional catalysts. Such an architecture results in lower tailpipe $N_2O$ without compromising $NO_x$ conversion capabilities. The upstream SCR catalyst may also include low $NH_3$ storage capacity compared to conventional catalysts, which results in lower $NH_3$ slip due to low-to-high temperature transients. As described in further detail herein, the term "SCR catalyst" should be understood as including any component having de-$NO_x$ capabilities (the ability to reduce $NO_x$ levels in an exhaust gas stream) including, for example, SCR catalysts, SCR on filter components, and other components.

For example, various embodiments are directed to exhaust aftertreatment architectures based on the above principles, namely, a combination of catalysts with inherently low $N_2O$ formation and low $NH_3$ storage properties with catalysts having high $NO_x$ conversion ability. Such systems exhibit high de-$NO_x$ capabilities while minimizing $N_2O$ formation. In one embodiment, an exhaust aftertreatment system includes an upstream SCR catalyst (e.g., an iron (Fe)-based or vanadia (V)-based catalyst) configured for low $N_2O$ formation and low $NH_3$ storage capacity, and a downstream SCR catalyst (e.g., a copper (Cu)-based catalyst) configured for high $NH_3$ storage capacity.

Some embodiments further include a hydrolysis catalyst positioned between the SCR catalysts to convert any isocyanic acid (HNCO) present in the exhaust gas to $NH_3$, thereby maximizing the de-$NO_x$ capabilities of the downstream SCR catalyst. As discussed herein, various embodiments include different combinations of SCR catalyst formulations, depending on operational requirements. Accordingly, the advanced exhaust aftertreatment systems described herein are optimized to minimize both $NO_x$ and $N_2O$ emissions. In doing so, such systems are capable of meeting increasingly stringent exhaust emissions requirements to be implemented in future years.

In general, SCR catalysts are configured to convert $NO_x$ (NO and $NO_2$ in some fraction) into harmless nitrogen gas ($N_2$) and water vapor ($H_2O$). Some exhaust aftertreatment systems include an SCR on filter instead of or in addition to an SCR catalyst. An SCR on filter is an assembly that performs the combined functions of an SCR and a DPF. In exhaust aftertreatment systems including an SCR catalyst and/or an SCR on filter, a reductant (typically $NH_3$ in some form) is added to the exhaust gas upstream of the catalyst. The $NO_x$ and $NH_3$ pass over the catalyst and a catalytic reaction takes place in which $NO_x$ and $NH_3$ are converted into $N_2$ and $H_2O$ by the following reaction:

$$2NH_3 + NO + NO_2 \rightarrow 2N_2 + 3H_2O \quad (1)$$

In many conventional SCR and SCR on filter systems, $NH_3$ is used as a reductant. Typically, pure $NH_3$ is not directly used due to safety concerns, expense, weight, lack of infrastructure, and other factors. Instead, many conventional systems utilize diesel exhaust fluid (DEF), which typically is a urea-water solution. DEF may be injected directly into the exhaust gas stream or into a decomposition tube to facilitate the decomposition of the urea into $NH_3$. The exhaust gas mixture including the $NH_3$ decomposed from the urea further mixes with the exhaust gas and passes over the SCR catalyst (e.g., SCR "brick"), where the $NO_x$ and $NH_3$ are converted to $N_2$ and $H_2O$.

The reduction of $NO_x$ in exhaust aftertreatment systems may result in the generation of $N_2O$, which is also classified as a harmful regulated emission. In particular, $N_2O$ may be formed from an undesired reaction between $NO_x$ and $NH_3$ over a catalytic device, such as an SCR catalyst. $N_2O$ may be formed over SCR catalysts by three mechanisms. First, $N_2O$ may be formed by decomposition of ammonium nitrate ($NH_4NO_3$) by the reaction:

$$NH_4NO_3 \rightarrow N_2O + 2H_2O \quad (2)$$

Second, in SCR catalysts that utilize copper zeolite (CuZe) catalysts, $N_2O$ may be formed by high-temperature oxidation of $NH_3$ by CuZe catalysts by the reaction:

$$2NH_3 + 2O_2 \rightarrow N_2O + 3H_2O \quad (3)$$

Third, excess $NO_2$ (>50% of $NO_x$) in the exhaust gas may react with $NH_3$ to form $NH_4NO_3$ by the reaction:

$$2NH_3 + 2NO_2 \rightarrow NH_4NO_3 + N_2 + H_2O \quad (4)$$

The $NH_4NO_3$ formed in (4) then decomposes by reaction (2) to form $N_2O$. $N_2O$ formation based on the above mechanisms may be influenced by several factors, including catalyst formulation and aftertreatment system architecture as described in further detail herein. Accordingly, advanced exhaust aftertreatment system architectures, in accordance with various embodiments, may be configured to minimize both $NO_x$ and $N_2O$ emissions.

FIG. 1 is a block diagram illustrating an engine 100 and an exhaust aftertreatment system 102 fluidly coupled to an exhaust manifold (not shown) of the engine 100, according to an embodiment. The engine 100 can be a compression-ignited or a spark-ignited engine, and can be powered by any of various fuels, such as diesel, natural gas, gasoline, etc. In one embodiment, the engine 100 is a diesel or a lean-burn gasoline engine. In operation, the engine 100 expels exhaust gas, which flows downstream from the engine 100 through the exhaust aftertreatment system 102. Generally, the exhaust aftertreatment system 102 is configured to remove various chemical and particulate emissions present in the exhaust gas.

The exhaust aftertreatment system 102 includes a first SCR catalyst 104 and a second SCR catalyst 106 positioned downstream of the first SCR catalyst 104. A reductant doser 108 is positioned upstream of the first SCR catalyst 104. As illustrated in FIG. 1, in some embodiments there are no oxidation catalysts or filters between the first and second catalysts 104, 106. The reductant doser 108 is configured to controllably inject a reductant (e.g., DEF) into the exhaust gas upstream of the first SCR catalyst 104. In the embodiment illustrated in FIG. 1, a single doser 108 is positioned upstream of the first SCR catalyst 104 In other embodiments, a second doser is positioned between the first SCR catalyst 104 and the second SCR catalyst 106. Further embodiments do not include a doser 108 upstream of the first SCR catalyst 104 (as illustrated in FIG. 1), but include a doser positioned between the first SCR catalyst 104 and the second SCR catalyst 106.

According to various embodiments, the first SCR catalyst 104 and the second SCR catalyst 106 have different catalyst formulations. The catalyst formulations may vary in terms of catalyst material and/or catalyst storage capacity. In one embodiment, the first SCR catalyst 104 includes an Fe-based (e.g., Fe zeolite (FeZe), FeCu, FeCuZe, etc.) or V-based catalyst configured for low $NH_3$ storage capacity. In some embodiments, the first SCR catalyst 104 includes a selective catalytic reduction catalyst on filter (e.g., FeZe SCR on filter, FeCuZe SCR on filter, etc.). In one embodiment, the second SCR catalyst 106 includes a Cu-based (e.g., Cu, CuZe, FeCuZe, etc.) catalyst configured for high $NH_3$ storage capacity. The presence of Fe in the first SCR catalyst 104 and the low $NH_3$ storage capacity operates to reduce the formation of $N_2O$ across the first SCR catalyst 104 and to improve the time of the SCR de-$NO_x$ reaction (e.g., by causing the SCR de-$NO_x$ reaction to start faster than in conventional systems). The presence of the Cu catalyst in the second SCR catalyst 106 and the high $NH_3$ storage capacity operates to reduce any $NO_x$ slip from the upstream catalysts (e.g., the first SCR catalyst 104), while minimizing $NH_3$ slip.

$NH_3$ storage capacity may be controlled in any of several ways, such as by catalyst amount per unit area, density, etc. $NH_3$ storage capacity may also be quantified in any of several ways, such as total $NH_3$ weight or volume capacity or by a ratio of $NH_3$ weight or volume per catalyst weight, volume, or area. For example, in one embodiment, low $NH_3$ storage capacity is less than 0.5 g $NH_3$ per liter of SCR catalyst volume and high $NH_3$ storage capacity is greater than 2 g $NH_3$ per liter of SCR catalyst volume. The different catalyst formulations may also exhibit different performance levels at certain operating conditions, such as temperature. In some embodiments, at least one of the first SCR catalyst 104 and the second SCR catalyst 106 is not zone coated with an oxidation catalyst. However, in other embodiments, at least one of the first SCR catalyst 104 and the second SCR catalyst 106 is zone coated with an oxidation catalyst.

Figure 2:
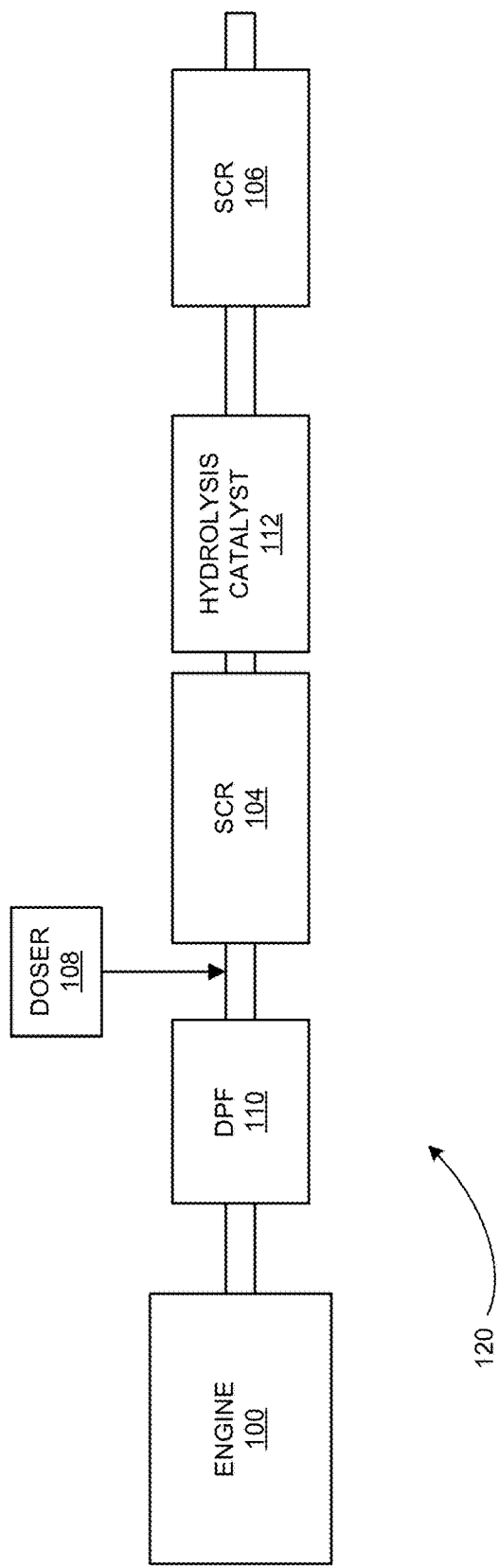
FIG. 2 is a block diagram of an exhaust aftertreatment system, according to another embodiment.

FIG. 2 is a block diagram of an exhaust aftertreatment system 120, according to another embodiment. The exhaust aftertreatment system 120 of FIG. 2 is similar to the exhaust aftertreatment system 102, with like numbers referring to like elements. As shown in FIG. 2, the exhaust aftertreatment system 120 further includes a DPF 110 positioned upstream of the doser 108. The DPF 110 is configured to filter harmful diesel particulate matter and soot present in the exhaust gas. In some embodiments, the DPF 110 is a catalyzed DPF. Some embodiments may include additional or alternative components, such as a DOC, an ASC, and other exhaust aftertreatment components.

The exhaust aftertreatment system 120 also includes a hydrolysis catalyst 112 positioned between the first SCR catalyst 104 and the second SCR catalyst 106. As mentioned above, the reductant doser 108 is configured to inject a reductant into the exhaust gas upstream of the SCR catalyst 104. Water in the droplets from the injected reductant evaporate, leaving urea, which decomposes in heat (pyrolyzes) to form HNCO and $NH_3$. The HNCO then hydrolyzes to create $NH_3$ and $CO_2$. These reactions may be represented generally as follows:

$$CO(NH_2)_2 + heat \rightarrow HNCO + NH_3 \qquad (5)$$

$$HNCO + H_2O \rightarrow NH_3 + CO_2 \qquad (6)$$

The hydrolysis catalyst 112 operates to catalyze reaction (6) to ensure that the HNCO is completely converted to $NH_3$ and $CO_2$. The exhaust gas, including the $NH_3$ formed in these reactions, may then pass through the second SCR catalyst 106, where a further catalytic reaction takes place in which $NO_x$ is converted into $N_2$ and $H_2O$ as shown by reaction (1).

The exhaust aftertreatment systems 102, 120 (FIG. 1 and FIG. 2, respectively) may utilize various alternative catalyst formulations and aftertreatment system architectures. For example, the first SCR catalyst 104 may be an Fe-based SCR (e.g., an FeZe SCR), a V-based SCR, an Fe-based SCR on filter (e.g., an FeZe SCR on filter), or a V-based SCR on filter. The second SCR catalyst 106 may be a Cu-Based SCR (e.g., a CuZe) or a Cu-based SCR on filter (e.g., a CuZe SCR on filter).

Figure 3:
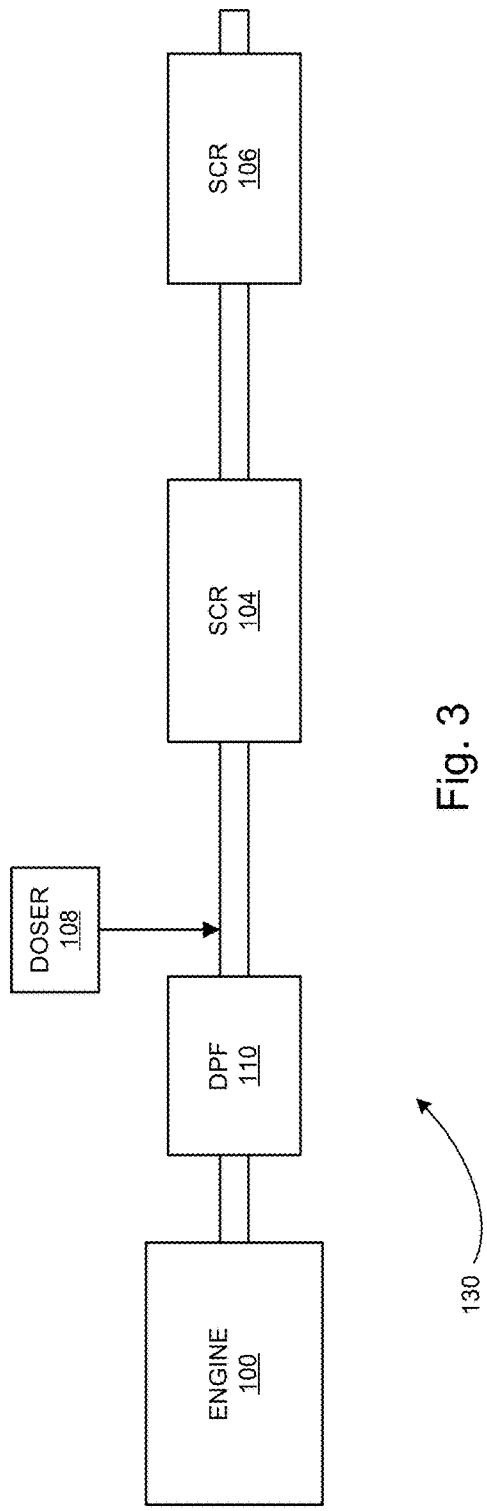
FIG. 3 is a block diagram of an exhaust aftertreatment system, according to another embodiment.

FIG. 3 is a block diagram of an exhaust aftertreatment system 130, according to another embodiment. The exhaust aftertreatment system 130 of FIG. 3 is similar to the system 120 of FIG. 2, except that the system 130 of FIG. 3 does not include the hydrolysis catalyst 112. Instead, the system 130 of FIG. 3 includes a significant gap between the first SCR catalyst 104 and the second SCR catalyst 106 to facilitate evaporation (e.g., complete evaporation) of the reductant (e.g., DEF) within the exhaust gas and to improve $NH_3$ distribution. For example, in one embodiment, the first SCR catalyst 104 and the second SCR catalyst 106 are positioned more than one inch apart. According to various embodiments, the first SCR catalyst 104 may be an Fe-based SCR (e.g., an FeZe SCR), a V-based SCR, an Fe-based SCR on filter (e.g., an FeZe SCR on filter), or a V-based SCR on filter. The second SCR catalyst 106 may be a Cu-Based SCR (e.g., a CuZe) or a Cu-based SCR on filter (e.g., a CuZe SCR on filter).

Figure 4:
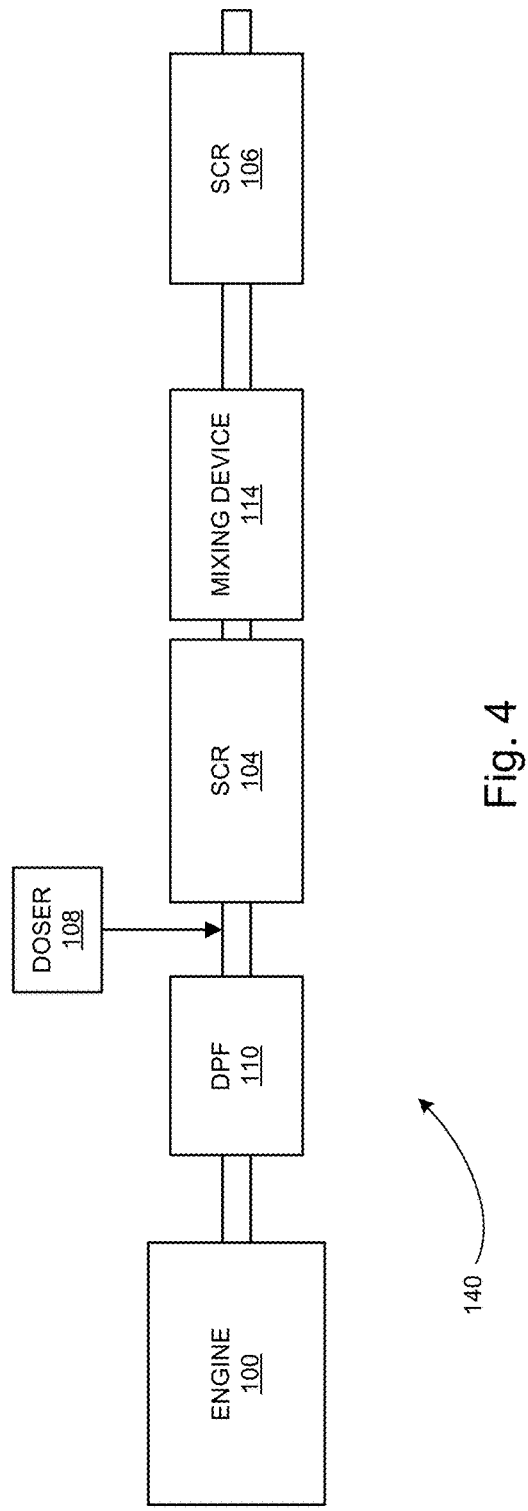
FIG. 4 is a block diagram of an exhaust aftertreatment system, according to another embodiment.

FIG. 4 is a block diagram of an exhaust aftertreatment system 140, according to another embodiment. The exhaust aftertreatment system 140 of FIG. 4 is similar to the system 120 of FIG. 2, except that the system 140 of FIG. 4 includes a mixing device 114 instead of the hydrolysis catalyst 112. The mixing device 114 is configured to facilitate evaporation (e.g., complete evaporation) of the reductant (e.g., DEF) within the exhaust gas in order to avoid build-up of deposits within the exhaust passage. The mixing device 114 can include any of various mixing features, such as wire mesh, vanes, honey comb structures, etc., or any combination thereof. According to various embodiments, the first SCR catalyst 104 may be an Fe-based SCR (e.g., an FeZe SCR), a V-based SCR, an Fe-based SCR on filter (e.g., an FeZe SCR on filter), or a V-based SCR on filter. The second SCR catalyst 106 may be a Cu-Based SCR (e.g., a CuZe) or a Cu-based SCR on filter (e.g., a CuZe SCR on filter).

Figure 5:
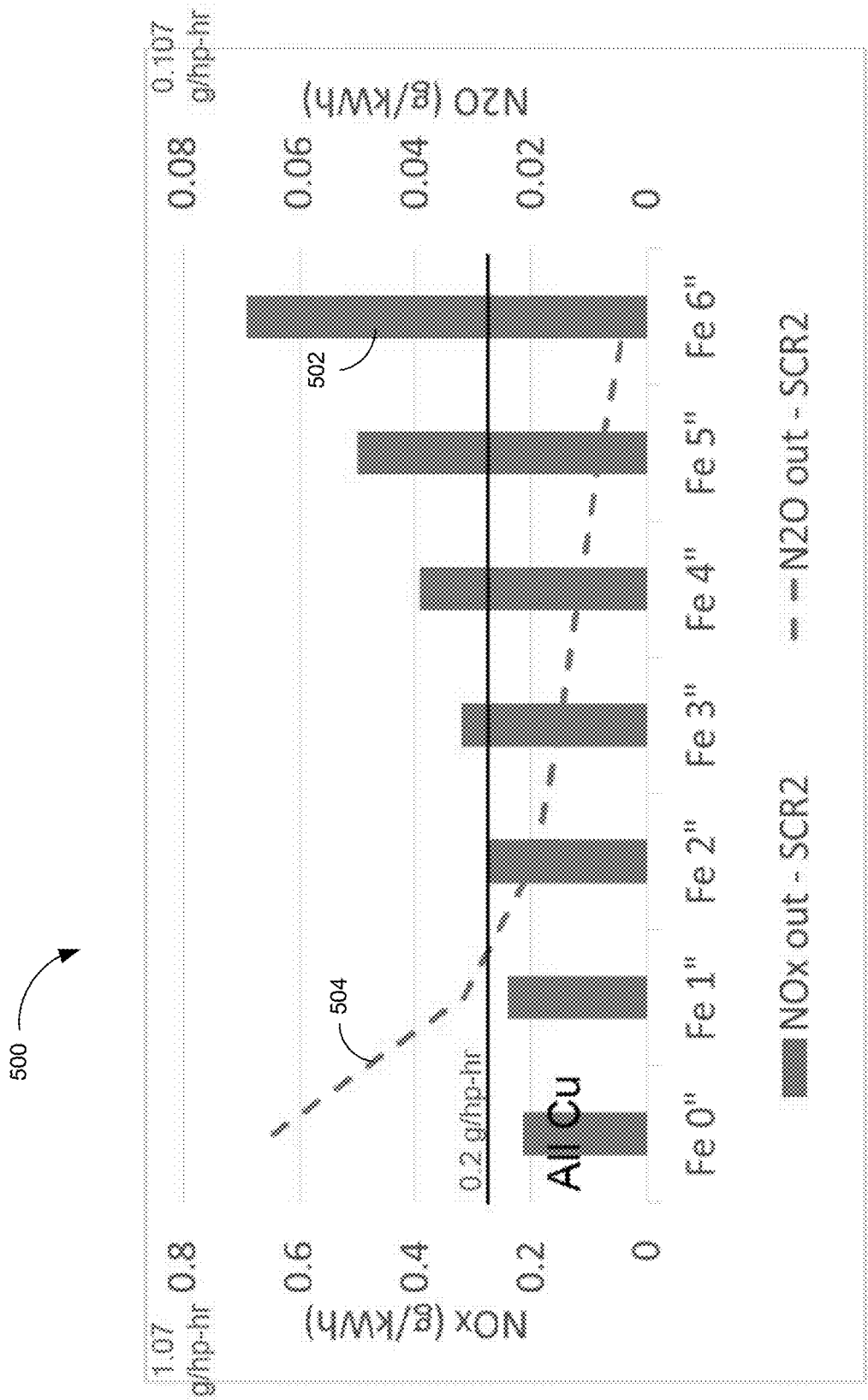
FIG. 5 is a plot of experimental results of an embodiment including an exhaust aftertreatment system, illustrating the efficacy of Fe-based and Cu-based SCR catalysts in reducing $N_2O$ and $NO_x$ in an exhaust gas stream.

FIG. 5 is a plot of experimental results 500 of an embodiment including an exhaust aftertreatment system, illustrating the efficacy of Fe-based and Cu-based SCR catalysts in reducing $N_2O$ and $NO_x$ in an exhaust gas stream. For example, the results of FIG. 5 are for a system in which a first SCR catalyst is a Fe-based SCR catalyst and a second SCR catalyst downstream of the first SCR catalyst is a Cu-based SCR catalyst. As shown in FIG. 5, $NO_x$ output is shown by bars 502 and $N_2O$ output is shown by a dashed line 504 for samples in which the first SCR catalyst includes varying amounts of Fe. In particular, the amount of Fe in the samples is controlled based on the axial length of the Fe-based catalyst. In the samples of FIG. 5, the axial length of the Fe-based catalyst varies from 0 inches to 6 inches. As shown in FIG. 5, the amount of $N_2O$ slip decreases and the amount of $NO_x$ slip increases as the Fe volume increases. It was found that an Fe-based catalyst of 2 inches in axial length provided the optimum levels of both $NO_x$ and $N_2O$ output. In particular, this sample exhibited $NO_x$ output below the 0.2 g/kWh limit and $N_2O$ output below the 0.02 g/kWh U.S. EPA limit.

Figure 6:
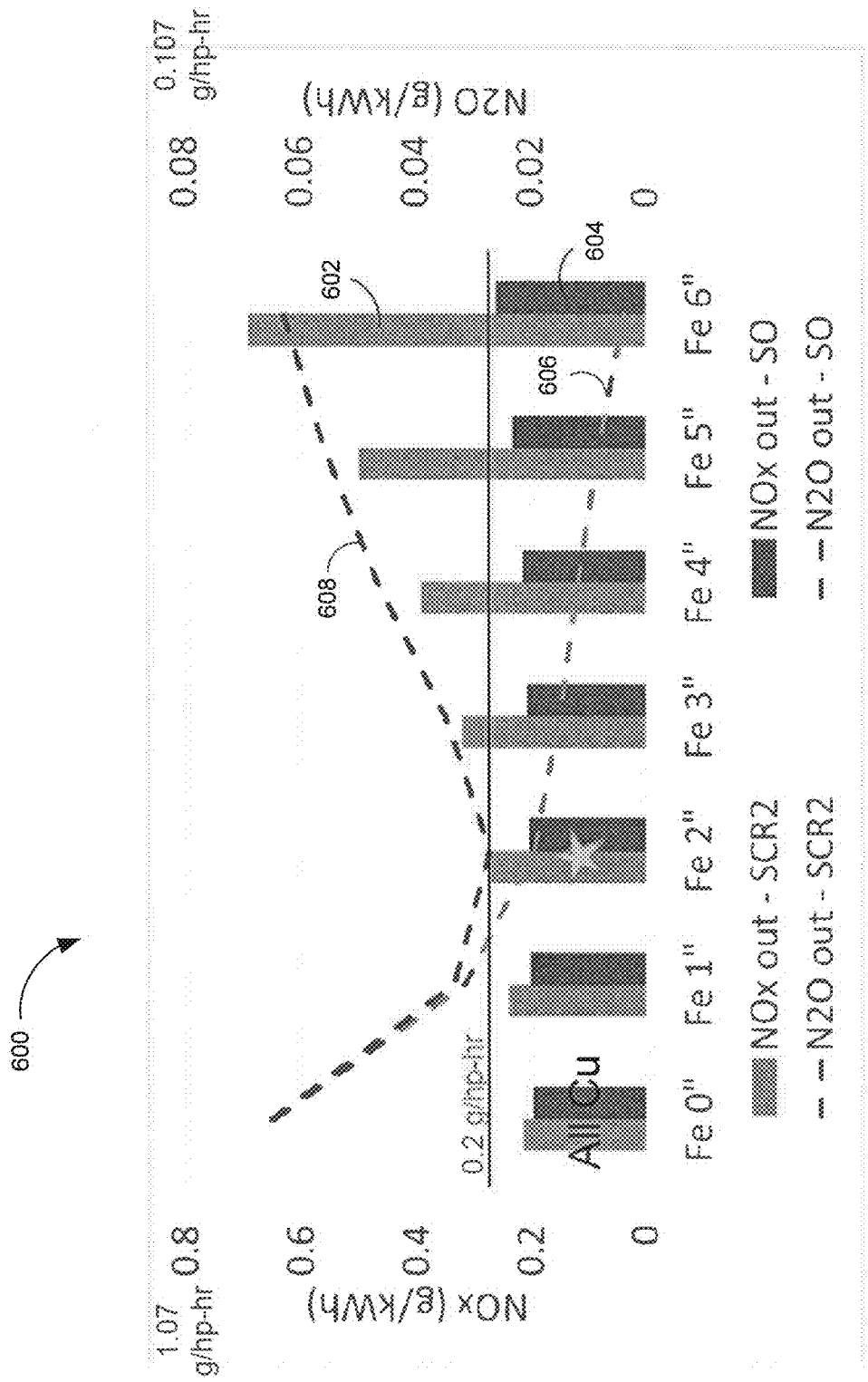
FIG. 6 is a plot of experimental results of another embodiment including an exhaust aftertreatment system, illustrating the efficacy of Fe-based and Cu-based SCR catalysts in reducing $N_2O$ and $NO_x$ in an exhaust gas stream.

FIG. 6 is a plot of experimental results 600 of another embodiment including an exhaust aftertreatment system, illustrating the efficacy of Fe-based and Cu-based SCR catalysts in reducing $N_2O$ and $NO_x$ in an exhaust gas stream. For example, the results of FIG. 6 are for a system in which a first SCR catalyst is a Fe-based SCR catalyst and a second SCR catalyst downstream of the first SCR catalyst is a Cu-based SCR catalyst, and a third SCR catalyst downstream of both the first and second SCR catalysts is also a Cu-based SCR catalyst. In some embodiments, any one of the first, second, and third SCR catalysts may be integrated into a single catalyst device, or may be separate devices. For example, in one embodiment, the first SCR catalyst is an FeCu SCR catalyst. As shown in FIG. 6, $NO_x$ output downstream of the second SCR catalyst is shown by first bars 602 and the $NO_x$ output downstream of the third SCR catalyst is shown by second bars 604 for samples in which the first SCR catalyst includes varying amounts of Fe. In addition, the $N_2O$ output downstream of the second SCR catalyst is shown by a first dashed line 606 and the $N_2O$ output downstream of the third SCR catalyst is shown by a second dashed line 608. The difference between the first and second bars 602, 604, and between the first and second dashed lines 606, 608, respectively, illustrates the effect of the third SCR catalyst, which is a Cu-based SCR catalyst, on $NO_x$ and $N_2O$ output. In particular, the third SCR catalyst causes the $N_2O$ output to increase substantially, while causing the $NO_x$ output to increase only slightly with increasing amounts of Fe in the first SCR catalyst. As shown in FIG. 6 relative to FIG. 5, exhaust aftertreatment systems that include multiple Cu-based SCR catalysts (e.g., an FeCu SCR catalyst and a downstream Cu SCR catalyst) provide improved $N_2O$ control (less $N_2O$ output) relative to systems with a single Cu-based SCR catalyst. It was found that an Fe-based catalyst of 2 inches in axial length provided the optimum levels of both $NO_x$ and $N_2O$ output. In particular, this sample exhibited $NO_x$ output below the 0.2 g/kWh limit and $N_2O$ output below the 0.02 g/kWh U.S. EPA limit.

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

It is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. It should be understood that features described in one embodiment could also be incorporated and/or combined with features from another embodiment in manner understood by those of ordinary skill in the art. It should also be noted that the terms "example" and "exemplary" as used herein to describe various embodiments are intended to indicate that such embodiments are possible examples, representations, and/or illustrations of possible embodiments (and such terms are not intended to connote that such embodiments are necessarily extraordinary or superlative examples).

What is claimed is:

1. An exhaust aftertreatment system configured to reduce nitrous oxide formation, comprising:
    a reductant doser;
    a first selective catalytic reduction catalyst positioned downstream of the reductant doser, the first selective catalytic reduction catalyst configured for low nitrous oxide formation and low ammonia storage capacity;
    a second selective catalytic reduction catalyst positioned downstream of the first selective catalytic reduction catalyst, the second selective catalytic reduction catalyst configured for high ammonia storage capacity; and
    a hydrolysis catalyst positioned between the first selective catalytic reduction catalyst and the second selective catalytic reduction catalyst, the hydrolysis catalyst structured to hydrolyze isocyanic acid formed from reductant injected by the reductant doser so as to improve nitrogen oxide reduction performance of the second selective catalytic reduction catalyst.

2. The system of claim 1, further comprising:
    a particulate filter positioned upstream of the reductant closer.

3. The system of claim 1, wherein first selective catalytic reduction catalyst includes less than 0.5 grams of ammonia per liter of SCR catalyst volume so as to provide the low ammonia storage capacity, and wherein the second selective catalytic reduction catalyst includes greater than 2 grams of ammonia per liter of SCR catalyst volume so as to provide the high ammonia storage capacity.

4. The system of claim 1, wherein the first selective catalytic reduction catalyst comprises an iron zeolite catalyst and wherein the second selective catalytic reduction catalyst comprises a copper zeolite catalyst.

5. The system of claim 4, wherein at least one of the first selective catalytic reduction catalyst and the second selective catalytic reduction catalyst comprises a copper iron zeolite catalyst.

6. The system of claim 4, wherein the second selective catalytic reduction catalyst is positioned at least one inch apart from the first selective catalytic reduction catalyst.

7. The system of claim 1, wherein each of the first selective catalytic reduction catalyst and the second selective catalytic reduction catalyst comprises an iron copper zeolite catalyst and wherein the second selective catalytic reduction catalyst is positioned at least one inch apart from the first selective catalytic reduction catalyst.

8. The system of claim 1, wherein the first selective catalytic reduction catalyst comprises a vanadia-based catalyst.

9. The system of claim 1, wherein the first selective catalytic reduction catalyst comprises an iron zeolite selective catalytic reduction catalyst on filter and wherein the second selective catalytic reduction catalyst comprises a copper-based catalyst.

10. The system of claim 1, wherein the first selective catalytic reduction catalyst comprises an iron copper zeolite selective catalytic reduction catalyst on filter and wherein the second selective catalytic reduction catalyst comprises a copper-based catalyst.

11. The system of claim 1, wherein the first selective catalytic reduction catalyst comprises a vanadia-based selective catalytic reduction catalyst on filter and wherein the second selective catalytic reduction catalyst comprises a copper-based catalyst.

12. A system, comprising:
    an exhaust aftertreatment system fluidly coupled to an exhaust manifold of an engine, the exhaust aftertreatment system comprising:
        a reductant doser;
        a first selective catalytic reduction catalyst positioned downstream of the reductant doser, the first selective catalytic reduction catalyst configured for low nitrous oxide formation and low ammonia storage capacity;
        a second selective catalytic reduction catalyst positioned downstream of the first selective catalytic reduction catalyst, the second selective catalytic reduction catalyst configured for high ammonia storage capacity; and
        a hydrolysis catalyst positioned between the first selective catalytic reduction catalyst and the second selective catalytic reduction catalyst, the hydrolysis catalyst structured to hydrolyze isocyanic acid formed from reductant injected by the reductant doser so as to improve nitrogen oxide reduction performance of the second selective catalytic reduction catalyst.

13. The system of claim 12, wherein the exhaust aftertreatment system further comprises:

a particulate filter positioned upstream of the reductant doser.

14. The system of claim 12, wherein the first selective catalytic reduction catalyst includes less than 0.5 grams of ammonia per liter of SCR catalyst volume so as to provide the low ammonia storage capacity, and wherein the second selective catalytic reduction catalyst includes greater than 2 grams of ammonia per liter of SCR catalyst volume so as to provide the high ammonia storage capacity.

15. The system of claim 12, wherein the first selective catalytic reduction catalyst comprises an iron zeolite catalyst and wherein the second selective catalytic reduction catalyst comprises a copper zeolite catalyst.

16. The system of claim 12, wherein the first selective catalytic reduction catalyst comprises a vanadia-based catalyst.

17. The system of claim 12, wherein the first selective catalytic reduction catalyst comprises an iron zeolite selective catalytic reduction catalyst on filter.

* * * * *